(12) United States Patent
Chen et al.

(10) Patent No.: US 9,158,094 B1
(45) Date of Patent: Oct. 13, 2015

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Shih-Han Chen, Central Taiwan Science Park (TW); Feng Chen, Fujian (CN); Baina Chen, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/521,681

(22) Filed: Oct. 23, 2014

(30) Foreign Application Priority Data

Jul. 29, 2014 (CN) .......................... 2014 1 0365785

(51) Int. Cl.
*G02B 3/02* (2006.01)
*G02B 13/00* (2006.01)
*G02B 9/62* (2006.01)

(52) U.S. Cl.
CPC .............. *G02B 13/0045* (2013.01); *G02B 9/62* (2013.01)

(58) Field of Classification Search
CPC ......................................................... G02B 9/64
USPC .................................................. 359/713, 714
See application file for complete search history.

(56) References Cited

U.S. PATENT DOCUMENTS

| 8,248,715 B2 | 8/2012 | Asami et al. |
| 8,477,431 B2 | 7/2013 | Huang |
| 2012/0162769 A1 * | 6/2012 | Suzuki et al. ................. 359/558 |

FOREIGN PATENT DOCUMENTS

| TW | M357610 U1 | 5/2009 |
| TW | 201317620 A1 | 5/2013 |
| TW | 201333575 A1 | 8/2013 |
| TW | 201426085 A | 7/2014 |

* cited by examiner

*Primary Examiner* — James Jones
(74) *Attorney, Agent, or Firm* — Baker & McKenzie LLP

(57) ABSTRACT

An imaging lens includes first to sixth lens elements arranged from an object side to an image side in the given order. Through designs of surfaces of the lens elements and relevant lens parameters, a short system length of the imaging lens may be achieved while maintaining good optical performance.

18 Claims, 28 Drawing Sheets

| lens element | surface | radius of curvature | thickness | refractive index | Abbe number | focal length |
|---|---|---|---|---|---|---|
| \multicolumn{7}{|l|}{system focal length =1.967mm , half field-of-view =70.00°, F-number =2.4, system length =4.300mm} ||||||
| object | | ∞ | ∞ | | | |
| first lens element 3 | object-side surface 31 | 32.0154 | 0.2860 | 1.535 | 55.712 | -4.678 |
| | image-side surface 32 | 2.3212 | 0.2161 | | | |
| second lens element 4 | object-side surface 41 | 1.1030 | 0.3647 | 1.640 | 23.529 | -6.422 |
| | image-side surface 42 | 0.7581 | 0.4464 | | | |
| third lens element 5 | object-side surface 51 | 1.1804 | 0.3644 | 1.544 | 56.114 | 1.952 |
| | image-side surface 52 | -9.7717 | 0.0395 | | | |
| aperture stop 2 | | ∞ | 0.0669 | | | |
| fourth lens element 6 | object-side surface 61 | 3.2759 | 0.4886 | 1.544 | 56.114 | 1.478 |
| | image-side surface 62 | -1.0145 | 0.1118 | | | |
| fifth lens element 7 | object-side surface 71 | -36.5285 | 0.2319 | 1.640 | 23.529 | -2.291 |
| | image-side surface 72 | 1.5427 | 0.3298 | | | |
| sixth lens element 8 | object-side surface 81 | -15.0287 | 0.4432 | 1.531 | 55.744 | -11.144 |
| | image-side surface 82 | 9.9186 | 0.2000 | | | |
| optical filter 9 | object-side surface 91 | ∞ | 0.2100 | | | |
| | image-side surface 92 | ∞ | 0.5008 | | | |
| image plane 100 | | ∞ | | | | |

FIG.3

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.059505961 | 0.171124616 | 0 | 0 | 0 | 0 | 0 |
| 41 | 0 | 0 | -0.422937045 | -0.000138719 | 0 | 0 | 0 | 0 | 0 |
| 42 | 0 | 0 | -0.923957585 | -0.027434358 | 0 | 0 | 0 | 0 | 0 |
| 51 | 0 | 0 | -0.292745382 | -0.475219143 | -0.173024835 | 0 | 0 | 0 | 0 |
| 52 | 0 | 0 | -0.365317412 | -0.239615114 | 0.194364715 | 0 | 0 | 0 | 0 |
| 61 | 0 | 0 | -0.244608071 | 0.746392647 | -2.483745611 | 3.973864526 | 0 | 0 | 0 |
| 62 | 0 | 0 | 0.321810547 | 0.017372253 | -1.358460355 | 1.92050282 | 0 | 0 | 0 |
| 71 | 0 | 0 | -0.490901767 | -0.279461511 | 0.0937837775 | -0.703643343 | 0 | 0 | 0 |
| 72 | 0 | 0 | -0.450957602 | 0.172935093 | -0.054114801 | 0.098120683 | 0 | 0 | 0 |
| 81 | 0 | 0 | 0.134761389 | 0.069448426 | -0.100104567 | -0.0650090071 | 0.039600807 | 0.0455657712 | -0.0380020735 |
| 82 | 0 | 0 | -0.255951181 | 0.237156496 | -0.011281678 | -0.0414482279 | -0.014256825 | 0.001945391 | 0.003750266 |

FIG.4

| lens element | surface | radius of curvature | thickness | refractive index | Abbe number | focal length |
|---|---|---|---|---|---|---|
| object | | ∞ | ∞ | | | |
| first lens element 3 | object-side surface 31 | 30.0682 | 0.3576 | 1.535 | 55.712 | -2.661 |
| | image-side surface 32 | 1.3581 | 0.2404 | | | |
| second lens element 4 | object-side surface 41 | 0.8715 | 0.2510 | 1.640 | 23.529 | -7.699 |
| | image-side surface 42 | 0.6577 | 0.3060 | | | |
| third lens element 5 | object-side surface 51 | 1.3310 | 0.3963 | 1.544 | 56.114 | 1.852 |
| | image-side surface 52 | -3.7599 | 0.0415 | | | |
| aperture stop 2 | | ∞ | 0.0756 | | | |
| fourth lens element 6 | object-side surface 61 | 2.1932 | 0.5924 | 1.544 | 56.114 | 1.279 |
| | image-side surface 62 | -0.9268 | 0.1473 | | | |
| fifth lens element 7 | object-side surface 71 | -4.6400 | 0.2988 | 1.640 | 23.529 | -1.773 |
| | image-side surface 72 | 1.5540 | 0.1333 | | | |
| sixth lens element 8 | object-side surface 81 | 23.1199 | 0.5262 | 1.531 | 55.744 | -25.067 |
| | image-side surface 82 | 8.3991 | 0.2000 | | | |
| optical filter 9 | object-side surface 91 | ∞ | 0.2100 | | | |
| | image-side surface 92 | ∞ | 0.4716 | | | |
| image plane 100 | | ∞ | | | | | system focal length =1.760nm, half field-of-view =70.00°, F-number =2.4, system length =4.248nm

FIG.7

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.090468049 | 0.283670858 | 0 | 0 | 0 | 0 | 0 |
| 41 | 0 | 0 | -0.538369944 | -0.35694153 | 0 | 0 | 0 | 0 | 0 |
| 42 | 0 | 0 | -0.926787763 | -0.583520517 | 0 | 0 | 0 | 0 | 0 |
| 51 | 0 | 0 | -0.198708889 | -0.029236275 | -0.202340965 | 0 | 0 | 0 | 0 |
| 52 | 0 | 0 | -0.37444333 | 0.181179553 | -0.676708854 | 0 | 0 | 0 | 0 |
| 61 | 0 | 0 | -0.257455883 | 0.449402905 | -1.779165588 | -0.024659878 | 0 | 0 | 0 |
| 62 | 0 | 0 | 0.300232763 | -0.035395176 | -0.763107748 | 0.144362479 | 0 | 0 | 0 |
| 71 | 0 | 0 | -0.621623978 | 0.236043899 | -1.419831944 | 1.652015139 | 0 | 0 | 0 |
| 72 | 0 | 0 | -0.317601852 | 0.028434861 | 0.068578795 | -0.065651583 | 0 | 0 | 0 |
| 81 | 0 | 0 | 0.251318077 | -0.037339518 | -0.209429434 | -0.110421073 | 0.180407752 | 0.294047022 | -0.377017914 |
| 82 | 0 | 0 | -0.305097473 | 0.274410666 | 0.01134373 | -0.063576653 | -0.009607277 | -0.035994916 | 0.025547211 |

FIG.8

| system focal length =2.090mm, half field-of-view =70.00°, F-number =2.4, system length =4.350mm | | | | | | |
|---|---|---|---|---|---|---|
| lens element | surface | radius of curvature | thickness | refractive index | Abbe number | focal length |
| object | | ∞ | ∞ | | | |
| first lens element 3 | object-side surface 31 | 27.9812 | 0.2980 | 1.535 | 55.712 | -6.209 |
| | image-side surface 32 | 2.9673 | 0.2390 | | | |
| second lens element 4 | object-side surface 41 | 0.9934 | 0.2883 | 1.640 | 23.529 | -6.004 |
| | image-side surface 42 | 0.7006 | 0.3198 | | | |
| third lens element 5 | object-side surface 51 | 1.5295 | 0.4489 | 1.544 | 56.114 | 2.364 |
| | image-side surface 52 | -7.4134 | 0.0772 | | | |
| aperture stop 2 | | ∞ | 0.0949 | | | |
| fourth lens element 6 | object-side surface 61 | 1.6112 | 0.5757 | 1.544 | 56.114 | 1.548 |
| | image-side surface 62 | -1.5535 | 0.1303 | | | |
| fifth lens element 7 | object-side surface 71 | -7.9750 | 0.2977 | 1.640 | 23.529 | -2.393 |
| | image-side surface 72 | 1.9401 | 0.1254 | | | |
| sixth lens element 8 | object-side surface 81 | 7.0090 | 0.5366 | 1.531 | 55.744 | -35.586 |
| | image-side surface 82 | 4.9813 | 0.2000 | | | |
| optical filter 9 | object-side surface 91 | ∞ | 0.2100 | | | |
| | image-side surface 92 | ∞ | 0.5083 | | | |
| image plane 100 | | ∞ | | | | |

FIG.11

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.110814312 | 0.116374216 | 0 | 0 | 0 | 0 | 0 |
| 41 | 0 | 0 | -0.424928155 | -0.095411013 | 0 | 0 | 0 | 0 | 0 |
| 42 | 0 | 0 | -0.980594468 | -0.177473733 | 0 | 0 | 0 | 0 | 0 |
| 51 | 0 | 0 | -0.195432629 | -0.410431647 | 1.268925185 | 0 | 0 | 0 | 0 |
| 52 | 0 | 0 | -0.452954536 | 0.016204467 | 0.164431219 | 0 | 0 | 0 | 0 |
| 61 | 0 | 0 | -0.306790052 | 0.592796053 | -2.568227379 | 1.833274418 | 0 | 0 | 0 |
| 62 | 0 | 0 | 0.303552421 | 0.088888983 | -2.502966541 | 1.694185322 | 0 | 0 | 0 |
| 71 | 0 | 0 | -0.173335748 | 0.226584668 | -1.635754666 | 1.111650032 | 0 | 0 | 0 |
| 72 | 0 | 0 | -0.108777639 | -0.162698527 | 0.182129117 | -0.075298503 | 0 | 0 | 0 |
| 81 | 0 | 0 | 0.059017702 | 0.009792527 | -0.034212883 | -0.075283353 | 0.047742208 | 0.009074051 | -0.009256835 |
| 82 | 0 | 0 | -0.326838948 | 0.219180482 | -0.030804861 | -0.025875821 | 0.007902071 | -0.009551862 | 0.005378848 |

FIG.12 system focal length =2.014mm , half field-of-view =80.00°, F-number =2.4, system length =4.300mm

| lens element | surface | radius of curvature | thickness | refractive index | Abbe number | focal length |
|---|---|---|---|---|---|---|
| object | | ∞ | ∞ | | | |
| first lens element 3 | object-side surface 31 | 31.6612 | 0.2961 | 1.535 | 55.712 | -5.267 |
| | image-side surface 32 | 2.5871 | 0.1556 | | | |
| second lens element 4 | object-side surface 41 | 1.0335 | 0.3756 | 1.640 | 23.529 | -6.054 |
| | image-side surface 42 | 0.7007 | 0.3451 | | | |
| third lens element 5 | object-side surface 51 | 1.3575 | 0.3967 | 1.544 | 56.114 | 2.364 |
| | image-side surface 52 | -23.4556 | 0.0627 | | | |
| aperture stop 2 | | ∞ | 0.0797 | | | |
| fourth lens element 6 | object-side surface 61 | 1.6867 | 0.5986 | 1.544 | 56.114 | 1.368 |
| | image-side surface 62 | -1.1716 | 0.0787 | | | |
| fifth lens element 7 | object-side surface 71 | -80.8589 | 0.2971 | 1.640 | 23.529 | -2.454 |
| | image-side surface 72 | 1.6160 | 0.1550 | | | |
| sixth lens element 8 | object-side surface 81 | -240.2828 | 0.5454 | 1.531 | 55.744 | -13.700 |
| | image-side surface 82 | 7.5351 | 0.2000 | | | |
| optical filter 9 | object-side surface 91 | ∞ | 0.2100 | | | |
| | image-side surface 92 | ∞ | 0.5037 | | | |
| image plane 100 | | ∞ | | | | |

FIG.15

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.114792774 | 0.116219799 | 0 | 0 | 0 | 0 | 0 |
| 41 | 0 | 0 | -0.274014885 | -0.174885946 | 0 | 0 | 0 | 0 | 0 |
| 42 | 0 | 0 | -0.813934978 | -0.405300369 | 0 | 0 | 0 | 0 | 0 |
| 51 | 0 | 0 | -0.227767128 | -0.341938148 | 0.662649821 | 0 | 0 | 0 | 0 |
| 52 | 0 | 0 | -0.409914144 | -0.302159237 | 0.403607507 | 0 | 0 | 0 | 0 |
| 61 | 0 | 0 | -0.227924399 | 0.166664888 | -1.318103278 | 0.172233549 | 0 | 0 | 0 |
| 62 | 0 | 0 | 0.399809552 | -0.240238918 | -2.046009743 | 1.511572199 | 0 | 0 | 0 |
| 71 | 0 | 0 | -0.31437369 | 0.016932345 | -1.786076436 | 1.385272224 | 0 | 0 | 0 |
| 72 | 0 | 0 | -0.253883594 | -0.014530642 | 0.045083068 | -0.009198284 | 0 | 0 | 0 |
| 81 | 0 | 0 | 0.180065027 | -0.050592659 | -0.064656573 | -0.024917489 | 0.033518099 | 0.005378641 | -0.008311663 |
| 82 | 0 | 0 | -0.277405369 | 0.176828823 | -0.001591252 | -0.018846093 | -0.010420491 | -0.002643206 | 0.003621013 |

FIG.16

| lens element | surface | radius of curvature | thickness | refractive index | Abbe number | focal length |
|---|---|---|---|---|---|---|
| \multicolumn{7}{|l|}{system focal length =1.895mm, half field-of-view =70.00°, F-number =2.4, system length =4.300mm} |||||||
| object | | ∞ | ∞ | | | |
| first lens element 3 | object-side surface 31 | 38.1479 | 0.2930 | 1.535 | 55.712 | -3.170 |
| | image-side surface 32 | 1.6246 | 0.1783 | | | |
| second lens element 4 | object-side surface 41 | 0.9340 | 0.3711 | 1.640 | 23.529 | -8.277 |
| | image-side surface 42 | 0.6711 | 0.3323 | | | |
| third lens element 5 | object-side surface 51 | 1.0405 | 0.3215 | 1.544 | 56.114 | 2.589 |
| | image-side surface 52 | 3.5127 | 0.0394 | | | |
| aperture stop 2 | | ∞ | 0.0626 | | | |
| fourth lens element 6 | object-side surface 61 | 1.5241 | 0.5700 | 1.544 | 56.114 | 1.247 |
| | image-side surface 62 | -1.0683 | 0.0891 | | | |
| fifth lens element 7 | object-side surface 71 | -13.9310 | 0.4966 | 1.640 | 23.529 | -2.088 |
| | image-side surface 72 | 1.5108 | 0.1270 | | | |
| sixth lens element 8 | object-side surface 81 | 3.6306 | 0.4996 | 1.531 | 55.744 | 26.009 |
| | image-side surface 82 | 4.6839 | 0.2000 | | | |
| optical filter 9 | object-side surface 91 | ∞ | 0.2100 | | | |
| | image-side surface 92 | ∞ | 0.5098 | | | |
| image plane 100 | | ∞ | | | | |

FIG.19

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.110120037 | 0.195865136 | 0 | 0 | 0 | 0 | 0 |
| 41 | 0 | 0 | -0.30647856 | -0.257150791 | 0 | 0 | 0 | 0 | 0 |
| 42 | 0 | 0 | -0.866577276 | -0.787686028 | 0 | 0 | 0 | 0 | 0 |
| 51 | 0 | 0 | -0.353737055 | -0.759458809 | -0.611417446 | 0 | 0 | 0 | 0 |
| 52 | 0 | 0 | -0.343574644 | -1.934766279 | 1.941543045 | 0 | 0 | 0 | 0 |
| 61 | 0 | 0 | -0.175681703 | -0.520423081 | -1.519492154 | 2.444778393 | 0 | 0 | 0 |
| 62 | 0 | 0 | 0.151273581 | 0.325476546 | -3.231663371 | 3.640861161 | 0 | 0 | 0 |
| 71 | 0 | 0 | -0.459789623 | -0.393106221 | 0.007575372 | -0.398041689 | 0 | 0 | 0 |
| 72 | 0 | 0 | -0.336909173 | 0.113778771 | -0.01262677 | -0.020899007 | 0 | 0 | 0 |
| 81 | 0 | 0 | -0.014825063 | 0.168969409 | -0.174243014 | -0.101348031 | 0.135494612 | 0.062404473 | -0.087724592 |
| 82 | 0 | 0 | -0.352268795 | 0.379916318 | -0.115685127 | -0.040250547 | 0.0070197 | 0.0137596673 | -0.005866564 |

FIG.20 system focal length =1.542mm , half field-of-view =80.00°, F-number =2.4, system length =4.350mm

| lens element | surface | radius of curvature | thickness | refractive index | Abbe number | focal length |
|---|---|---|---|---|---|---|
| object | | ∞ | ∞ | | | |
| first lens element 3 | object-side surface 31 | 34.2759 | 0.2762 | 1.535 | 55.712 | -2.533 |
| | image-side surface 32 | 1.3044 | 0.3325 | | | |
| second lens element 4 | object-side surface 41 | 0.9601 | 0.2454 | 1.640 | 23.529 | -12.372 |
| | image-side surface 42 | 0.7711 | 0.5416 | | | |
| third lens element 5 | object-side surface 51 | 0.9980 | 0.3909 | 1.544 | 56.114 | 1.889 |
| | image-side surface 52 | 26.8785 | 0.0557 | | | |
| aperture stop 2 | | ∞ | 0.1853 | | | |
| fourth lens element 6 | object-side surface 61 | 1.3289 | 0.5504 | 1.544 | 56.114 | 1.221 |
| | image-side surface 62 | -1.1425 | 0.0773 | | | |
| fifth lens element 7 | object-side surface 71 | -1.5812 | 0.2622 | 1.640 | 23.529 | -1.447 |
| | image-side surface 72 | 2.4240 | 0.0680 | | | |
| sixth lens element 8 | object-side surface 81 | 4.0469 | 0.4481 | 1.531 | 55.744 | 26.104 |
| | image-side surface 82 | 5.4876 | 0.2000 | | | |
| optical filter 9 | object-side surface 91 | ∞ | 0.2100 | | | |
| | image-side surface 92 | ∞ | 0.5065 | | | |
| image plane 100 | | | | | | |

FIG.23

| surface | K | a2 | a4 | a6 | a8 | a10 | a12 | a14 | a16 |
|---|---|---|---|---|---|---|---|---|---|
| 31 | | | | | Spherical Surface | | | | |
| 32 | 0 | 0 | 0.059758331 | 0.2538883 | 0 | 0 | 0 | 0 | 0 |
| 41 | 0 | 0 | -0.659371887 | -0.001353034 | 0 | 0 | 0 | 0 | 0 |
| 42 | 0 | 0 | -1.072155677 | 0.267361677 | 0 | 0 | 0 | 0 | 0 |
| 51 | 0 | 0 | -0.233586284 | 0.130238451 | -0.289338033 | 0 | 0 | 0 | 0 |
| 52 | 0 | 0 | -0.385111695 | -0.014497655 | 0.311195705 | 0 | 0 | 0 | 0 |
| 61 | 0 | 0 | -0.340040514 | -0.325890052 | 0.545228443 | -3.69746753 | 0 | 0 | 0 |
| 62 | 0 | 0 | 0.480705194 | 0.421960994 | -5.400279597 | 5.988862731 | 0 | 0 | 0 |
| 71 | 0 | 0 | -0.106854157 | 0.518901693 | -2.995446113 | 3.224773011 | 0 | 0 | 0 |
| 72 | 0 | 0 | -0.104328282 | 0.011053509 | -0.030342886 | -0.09805242 | 0 | 0 | 0 |
| 81 | 0 | 0 | 0.138510338 | -0.039302637 | -0.115875679 | -0.065016037 | 0.038728841 | 0.032853259 | -0.087397815 |
| 82 | 0 | 0 | -0.316295185 | 0.383946843 | -0.045038349 | -0.106548136 | -0.055010666 | -0.00136279 | 0.042825896 |

FIG.24

| relationship | first preferred embodiment | second preferred embodiment | third preferred embodiment | fourth preferred embodiment | fifth preferred embodiment | sixth preferred embodiment |
|---|---|---|---|---|---|---|
| Gaa/T5 | 5.219 | 3.160 | 3.314 | 2.952 | 1.668 | 4.807 |
| T2/T1 | 1.275 | 0.702 | 0.968 | 1.268 | 1.267 | 0.889 |
| T2/G12 | 1.687 | 1.044 | 1.207 | 2.414 | 2.082 | 0.738 |
| ALT/G12 | 10.082 | 10.075 | 10.232 | 16.125 | 14.314 | 6.535 |
| G12/G45 | 1.933 | 1.632 | 1.834 | 1.977 | 2.000 | 4.301 |
| T2/G23 | 0.817 | 0.820 | 0.902 | 1.089 | 1.117 | 0.453 |
| T4/G56 | 1.482 | 4.445 | 4.589 | 3.863 | 4.489 | 8.098 |
| T1/G34 | 2.688 | 3.053 | 1.731 | 2.080 | 2.875 | 1.146 |
| G12/G56 | 0.655 | 1.804 | 1.905 | 1.004 | 1.404 | 4.893 |
| T2/T5 | 1.572 | 0.840 | 0.969 | 1.264 | 0.747 | 0.936 |
| T3/G34 | 3.425 | 3.384 | 2.609 | 2.786 | 3.155 | 1.622 |
| T4/G34 | 4.593 | 5.057 | 3.345 | 4.204 | 5.592 | 2.284 |
| T4/T3 | 1.341 | 1.495 | 1.282 | 1.509 | 1.773 | 1.408 |
| ALT/G34 | 20.482 | 20.681 | 14.208 | 17.625 | 25.038 | 9.018 |
| Gaa/T4 | 2.477 | 1.594 | 1.714 | 1.465 | 1.454 | 2.290 |
| G56/G45 | 2.950 | 0.905 | 0.963 | 1.968 | 1.424 | 0.879 |
| G56/G34 | 3.100 | 1.138 | 0.729 | 1.088 | 1.246 | 0.282 |

FIG.26

IMAGING LENS, AND ELECTRONIC APPARATUS INCLUDING THE SAME

CROSS-REFERENCE TO RELATED APPLICATION

This application claims priority of Chinese Patent Application No. 201410365735.2, filed on Jul. 29, 2014.

FIELD OF INVENTION

The invention relates to an imaging lens and an electronic apparatus including the same.

BACKGROUND OF THE INVENTION

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance. However, the most important characteristics of imaging lenses are imaging quality and size.

U.S. Pat. No. 8,477,431 discloses a relatively long conventional imaging lens that includes six lens elements, where both of the object-side surface and the image-side surface of the third lens element have a concave portion in a vicinity of a periphery of the third lens element. This design easily leads to a substantially undersized/small field of view which makes it difficult to comply with increasingly stringent design requirements.

Reducing the system length of the imaging lens while maintaining satisfactory optical performance is always a goal in the industry.

SUMMARY OF THE INVENTION

Therefore, the object of the present invention is to provide an imaging lens having a shorter overall length while maintaining good optical performance.

According to one aspect of the present invention, there is provided an imaging lens including a first lens element, a second lens element, a third lens element, a fourth lens element, a fifth lens element and a sixth lens element arranged in order from an object side to an image side along an optical axis of the imaging lens. Each of the first lens element, the second lens element, the third lens element, the fourth lens element, the fifth lens element and the sixth lens element has a refractive power, an object-side surface facing toward the object side, and an image-side surface facing toward the image side.

The object-side surface of the first lens element has a convex portion in a vicinity of a periphery of the first lens element, and the image-side surface of the first lens element has a concave portion in a vicinity of the periphery of the first lens element. The object-side surface of the second lens element has a convex portion in a vicinity of a periphery of the second lens element. The object-side surface of the third lens element has a convex portion in a vicinity of a periphery of the third lens element, and the image-side surface of the third lens element has a convex portion in a vicinity of the periphery of the third lens element. The object-side surface of the fourth lens element has a convex portion in a vicinity of the optical axis. The object-side surface of the fifth lens element has a concave portion in a vicinity of a periphery of the fifth lens element. The image-side surface of the sixth lens element has a convex portion in a vicinity of a periphery of the sixth lens element. The imaging lens does not include any lens element with refractive power other than the first lens element, the second lens element, the third lens element, the fourth lens element, the fifth lens element and the sixth lens element. The imaging lens satisfies Gaa/T5≤5.5, where Gaa represents a sum of five air gap lengths among the first lens element, the second lens element, the third lens element, the fourth lens element, the fifth lens element and the sixth lens element at the optical axis, and T5 represents a thickness of the fifth lens element at the optical axis.

Another object of the present invention is to provide an electronic apparatus including an imaging lens with six lens elements.

According to another aspect of the present invention, there is provided an electronic apparatus including a housing and an imaging module. The imaging module is disposed in the housing, and includes the imaging lens of this invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the embodiments with reference to the accompanying drawings, of which:

FIG. 3 shows values of some optical data corresponding to the imaging lens of the first embodiment;

FIG. 4 shows values of some aspherical coefficients corresponding to the imaging lens of the first embodiment;

FIG. 7 shows values of some optical data corresponding to the imaging lens of the second embodiment;

FIG. 8 shows values of some aspherical coefficients corresponding to the imaging lens of the second embodiment;

FIG. 11 shows values of some optical data corresponding to the imaging lens of the third embodiment;

FIG. 12 shows values of some aspherical coefficients corresponding to the imaging lens of the third embodiment;

FIG. 15 shows values of some optical data corresponding to the imaging lens of the fourth embodiment;

FIG. 16 shows values of some aspherical coefficients corresponding to the imaging lens of the fourth embodiment;

FIG. 19 shows values of some optical data corresponding to the imaging lens of the fifth embodiment;

FIG. 20 shows values of some aspherical coefficients corresponding to the imaging lens of the firth embodiment;

FIG. 23 shows values of some optical data corresponding to the imaging lens of the sixth embodiment;

FIG. 24 shows values of some aspherical coefficients corresponding to the imaging lens of the sixth embodiment;

FIG. 26 is a table that lists values of relationships among some lens parameters corresponding to the imaging lenses of the first to sixth embodiments;

DETAILED DESCRIPTION OF THE EMBODIMENTS

Figure 1:
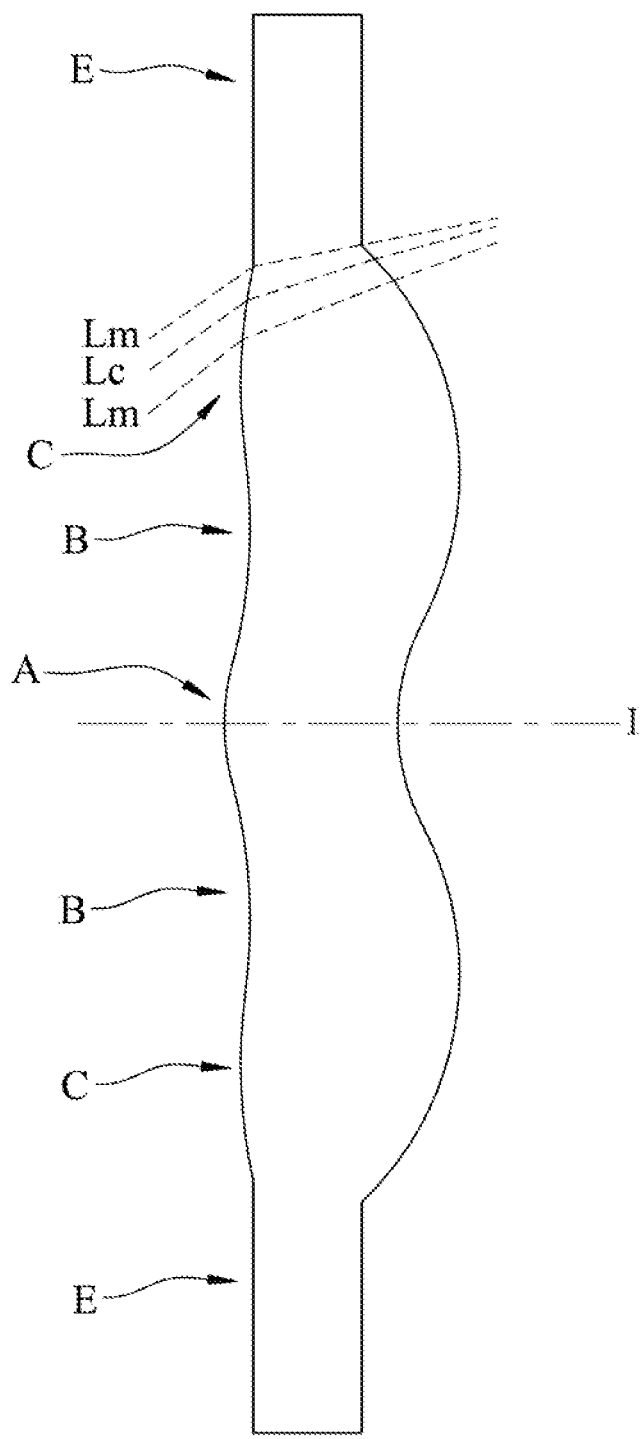
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
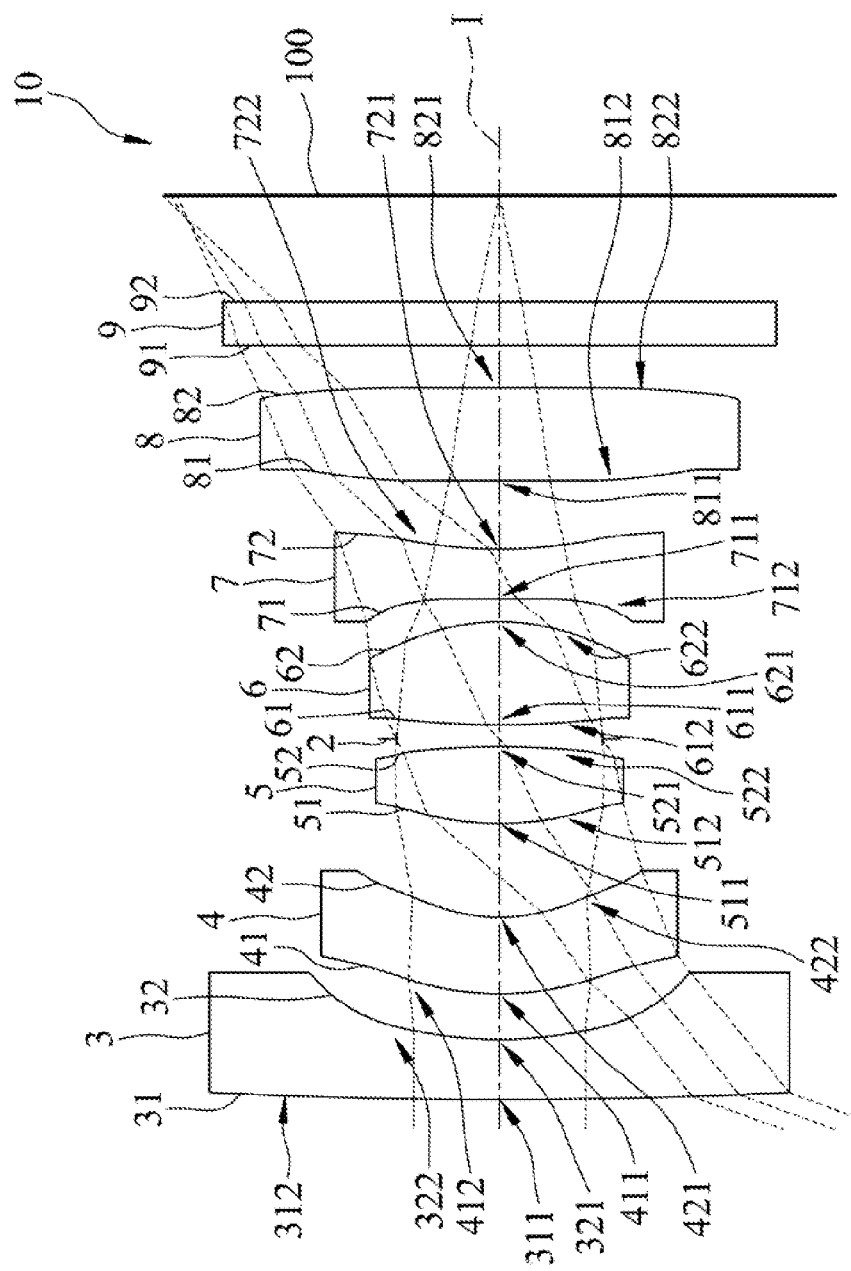
FIG. 2 is a schematic diagram that illustrates the first embodiment of an imaging lens according to the present invention.

Referring to FIG. 2, the first embodiment of an imaging lens 10 according to the present invention includes a first lens element 3, a second lens element 4, a third lens element 5, an aperture stop 2, a fourth lens element 6, a fifth lens element 7, a sixth lens element 8 and an optical filter 9 arranged in the given order from an object side to an image side along an optical axis (I) of the imaging lens 10. The optical filter 9 is an infrared cut filter for selectively absorbing infrared light to thereby reduce imperfection of images formed at an image plane 100.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 10 travels through the object-side and image-side surfaces 31, 32 of the first lens element 3, the object-side and image-side surfaces 41, 42 of the second lens element 4, the object-side and image-side surfaces 51, 52 of the third lens element 5, the aperture stop 2, the object-side and image-side surfaces 61, 62 of the fourth lens element 6, the object-side and image-side surfaces 71, 72 of the fifth lens element 7, the object-side and image-side surfaces 81, 82 of the sixth lens element 8, and the object-side and image-side surfaces 91, 92 of the optical filter 9, in the given order, to form an image on the image plane 100. In this embodiment, each of the object-side surfaces 41, 51, 61, 71, 81 and the image-side surfaces 32, 42, 52, 62, 72, 82 is aspherical and has a center point coinciding with the optical axis (I).

Each of the lens elements 3-8 is made of a plastic material and has a refractive power in this embodiment. However, at least one of the lens elements 3-8 may be made of other materials in other embodiments.

In the first embodiment, which is depicted in FIG. 2, the first lens element 3 has a negative refractive power. The object-side surface 31 of the first lens element 3 is a convex surface that has a convex portion 311 in a vicinity of the optical axis (I), and a convex portion 312 in a vicinity of a periphery of the first lens element 3. The image-side surface 32 of the first lens element 3 is a concave surface that has a concave portion 321 in a vicinity of the optical axis (I), and a concave portion 322 in a vicinity of the periphery of the first lens element 3.

The second lens element 4 has a negative refractive power. The object-side surface 41 of the second lens element 4 is a convex surface that has a convex portion 411 in a vicinity of the optical axis (I), and a convex portion 412 in a vicinity of a periphery of the second lens element 4. The image-side surface 42 of the second lens element 4 is a concave surface that has a concave portion 421 in a vicinity of the optical axis (I), and a concave portion 422 in a vicinity of the periphery of the second lens element 4.

The third lens element 5 has a positive refractive power. The object-side surface 51 of the third lens element 5 is a convex surface that has a convex portion 511 in a vicinity of the optical axis (I), and a convex portion 512 in a vicinity of a periphery of the third lens element 5. The image-side surface 52 of the third lens element 5 is a convex surface that has a convex portion 521 in a vicinity of the optical axis (I), and a convex portion 522 in a vicinity of the periphery of the third lens element 5.

The fourth lens element 6 has a positive refractive power. The object-side surface 61 of the fourth lens element 6 is a convex surface that has a convex portion 611 in a vicinity of the optical axis (I), and a convex portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a negative refractive power. The object-side surface 71 of the fifth lens element 7 is a concave surface that has a concave portion 711 in a vicinity of the optical axis (I), and a concave portion 712 in a vicinity of a periphery of the fifth lens element 7. The image-side surface 72 of the fifth lens element 7 is a concave surface that has a concave portion 721 in a vicinity of the optical axis (I), and a concave portion 722 in a vicinity of the periphery of the fifth lens element 7.

The sixth lens element 8 has a negative refractive power. The object-side surface 81 of the sixth lens element 8 has a concave portion 811 in a vicinity of the optical axis (I), and a convex portion 812 in a vicinity of a periphery of the sixth lens element 8. The image-side surface 82 of the sixth lens element 8 has a concave portion 821 in a vicinity of the optical axis (I), and a convex portion 822 in a vicinity of the periphery of the sixth lens element 8.

In the first embodiment, the imaging lens 10 does not include any lens element with refractive power other than the aforesaid lens elements 3-8.

Shown in FIG. 3 is a table that lists values of some optical data corresponding to the surfaces 31-91, 32-92 of the first embodiment. The imaging lens 10 has an overall system effective focal length (EFL) of 1.967 mm, a half field-of-view (HFOV) of 70.00°, an F-number of 2.4, and a system length of 4.300 mm. The system length refers to a distance between the object-side surface 31 of the first lens element 3 and the image plane 100 at the optical axis (I).

In this embodiment, the object-side surface 31 of the first lens element 3 is spherical, while each of the object-side surfaces 41-81 and the image-side surfaces 32-82 is aspherical, and satisfies the relationship of $$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

where:
R represents a radius of curvature of an aspherical surface;
Z represents a depth of the aspherical surface, which is defined as a perpendicular distance between an arbitrary point on the aspherical surface that is spaced apart from the optical axis (I) by a distance Y, and a tangent plane at a vertex of the aspherical surface at the optical axis (I);
Y represents a perpendicular distance between the arbitrary point on the aspherical surface and the optical axis (I);
K represents a conic constant; and
$a_{2i}$ represents a $2i^{th}$ aspherical coefficient.

Shown in FIG. 4 is a table that lists values of some aspherical coefficients of the aforementioned relationship (1) corresponding to the first embodiment. Each of the rows numbered 41-81 and 32-82 in FIG. 4 lists the aspherical values of a respective one of the object-side surfaces 41-81 and the image-side surfaces 32-82.

Relationships among some of the lens parameters corresponding to the first embodiment are shown in FIG. 26. Note that some terminologies are defined as follows:
T1 represents a thickness of the first lens element 3 at the optical axis (I);
T2 represents a thickness of the second lens element 4 at the optical axis (I);
T3 represents a thickness of the third lens element 5 at the optical axis (I);
T4 represents a thickness of the fourth lens element 6 at the optical axis (I);
T5 represents a thickness of the fifth lens element 7 at the optical axis (I);
T6 represents a thickness of the sixth lens element 8 at the optical axis (I);
G12 represents an air gap length between the first lens element 3 and the second lens element 4 at the optical axis (I);
G23 represents an air gap length between the second lens element 4 and the third lens element 5 at the optical axis (I);
G34 represents an air gap length between the third lens element 5 and the fourth lens element 6 at the optical axis (I);
G45 represents an air gap length between the fourth lens element 6 and the fifth lens element 7 at the optical axis (I);
G56 represents an air gap length between the fifth lens element 7 and the sixth lens element 8 at the optical axis (I);
G6F represents an air gap length between the sixth lens element 8 and the optical filter 9 at the optical axis (I);
TF represents a thickness of the optical filter 9 at the optical axis (I);
GFP represents an air gap length between the optical filter 9 and the image plane 100 at the optical axis (I);
Gaa represents a sum of five air gap lengths among the first lens element 3, the second lens element 4, the third lens element 5, the fourth lens element 6, the fifth lens element 7 and the sixth lens element 8 at the optical axis (I) (i.e., the sum of G12, G23, G34, G45 and G56);
ALT represents a sum of the thicknesses of the first lens element 3, the second lens element 4, the third lens element 5, the fourth lens element 6, the fifth lens element 7 and the sixth lens element 8 at the optical axis (I) (i.e., the sum of T1, T2, T3, T4, T5 and T6);
TTL represents a distance between the object-side surface 31 of the first lens element 3 and the image plane 100 at the optical axis (I);
BPL represents a distance between the image-side surface 82 of the sixth lens element 8 and the image plane 100 at the optical axis (I) (i.e., a sum of G6F, TF and GFP); and
EFL represents a system focal length of the imaging lens 10.
f1, f2, f3, f4, f5 and f6 respectively represent focal lengths of the first, second, third, fourth, fifth and sixth lens elements 3-8;
n1, n2, n3, n4, n5 and n6 respectively represent refractive indices of the first, second, third, fourth, fifth and sixth lens elements 3-8; and
ν1, ν2, ν3, ν4, ν5 and ν6 respectively represent Abbe numbers of the first, second, third, fourth, fifth and sixth lens elements 3-8.

FIGS. 5(a) to 5(d) respectively show simulation results corresponding to longitudinal spherical aberration, sagittal astigmatism aberration, tangential astigmatism aberration, and distortion aberration of the first embodiment. In each of the simulation results, curves corresponding respectively to wavelengths of 470 nm, 555 nm, and 650 nm are shown.

It can be understood from FIG. 5(a) that, since each of the curves corresponding to longitudinal spherical aberration has a focal length at each field of view (indicated by the vertical axis) that falls within the range of ±0.01 mm, the first embodiment is able to achieve a relatively low spherical aberration at each of the wavelengths. Furthermore, since the curves at each of the wavelengths of 470 nm, 555 nm, and 650 nm are close to each other, the first embodiment has a relatively low chromatic aberration.

Figure 5:
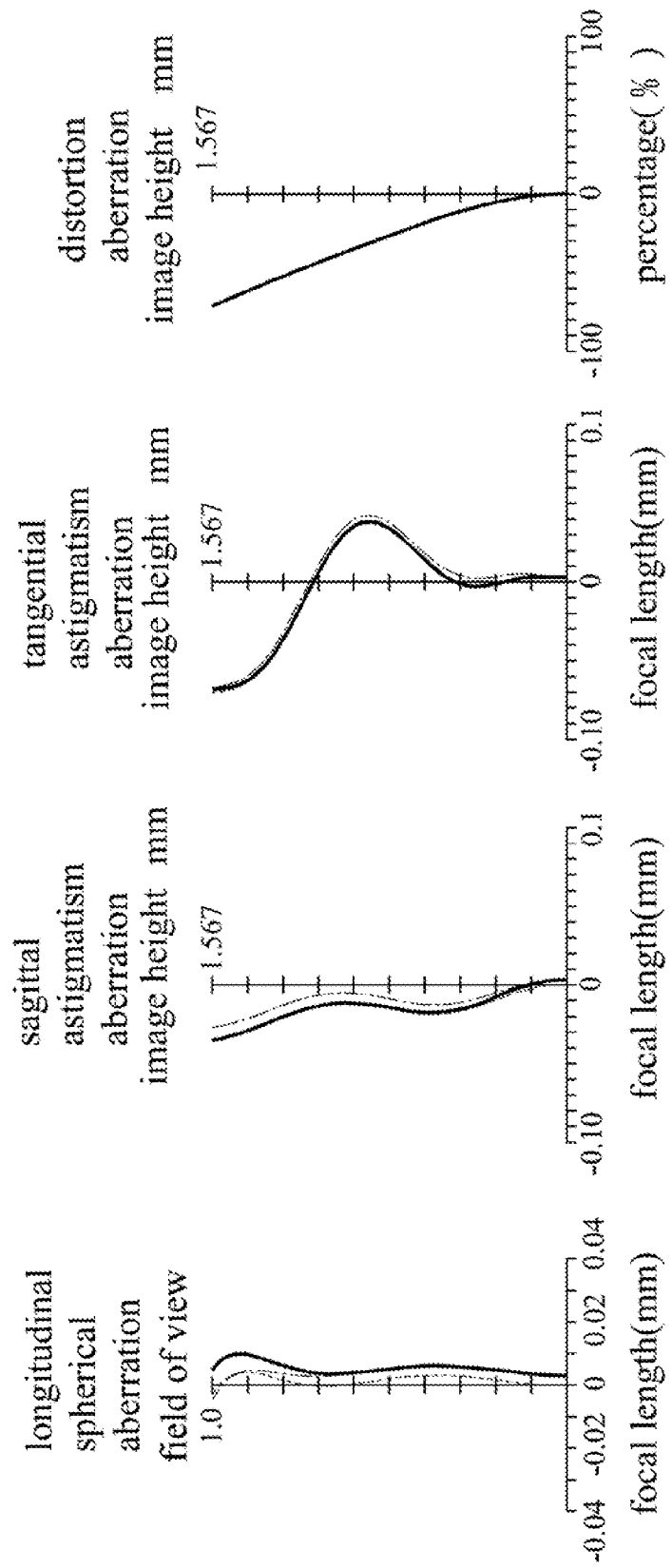
FIGS. 5(a) to 5(d) show different optical characteristics of the imaging lens of the first embodiment.

It can be understood from FIGS. 5(*b*) and 5(*c*) that, since each of the curves falls within the range of ±0.08 mm of focal length, the first embodiment has a relatively low optical aberration. Moreover, as shown in FIG. 5(*d*), since each of the curves corresponding to distortion aberration falls within the range of ±70%, the first embodiment is able to meet requirements in imaging quality of most optical systems. In view of the above, even with the system length reduced down to 4.3 mm, the imaging lens 10 of the first embodiment is still able to achieve a relatively good optical performance.

Figure 6:
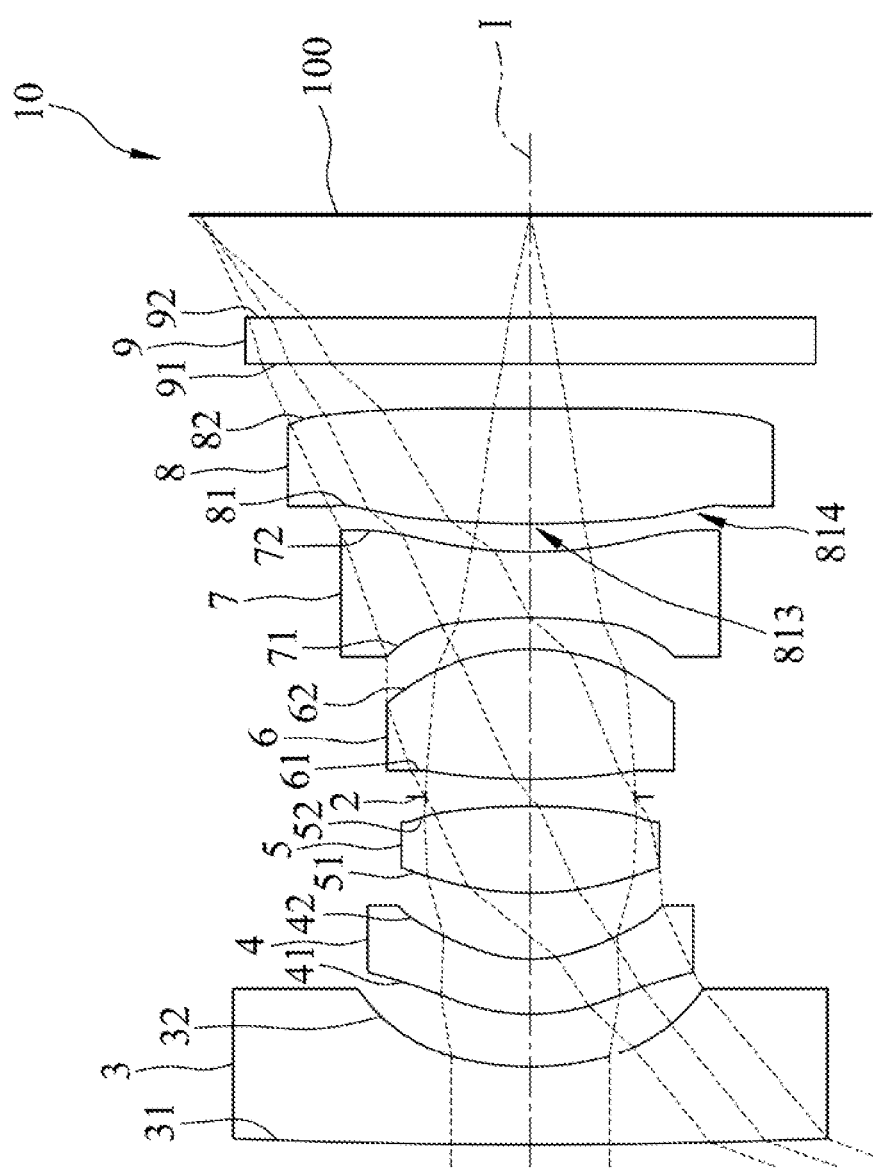
FIG. 6 is a schematic diagram that illustrates the second embodiment of an imaging lens according to the present invention.

FIG. 6 illustrates a second embodiment of an imaging lens 10 according to the present invention, which has a configuration similar to that of the first embodiment and differs in optical data, aspherical coefficients, and lens parameters of the first, second, third, fourth, fifth and sixth lens elements 3-8. Moreover, the object-side surface 81 of the sixth lens element 8 has a convex portion 813 in a vicinity of the optical axis (I), and a concave portion 814 in a vicinity of the periphery of the sixth lens element 8. It should be noted herein that, in order to clearly illustrate the second embodiment, reference numerals of the convex and concave portions that are the same as those of the first embodiment have been omitted in FIG. 6.

Shown in FIG. 7 is a table that lists values of some optical data corresponding to the surfaces 31-91, 32-92 of the second embodiment. The imaging lens 10 has an overall system focal length of 1.760 mm, an HFOV of 70.000°, an F-number of 2.4, and a system length of 4.248 mm.

Shown in FIG. 8 is a table that lists values of some aspherical coefficients of the aforementioned relationship (1) corresponding to the second embodiment.

Relationships among some of the aforementioned lens parameters corresponding to the second embodiment are shown in FIG. 26.

Figure 9:
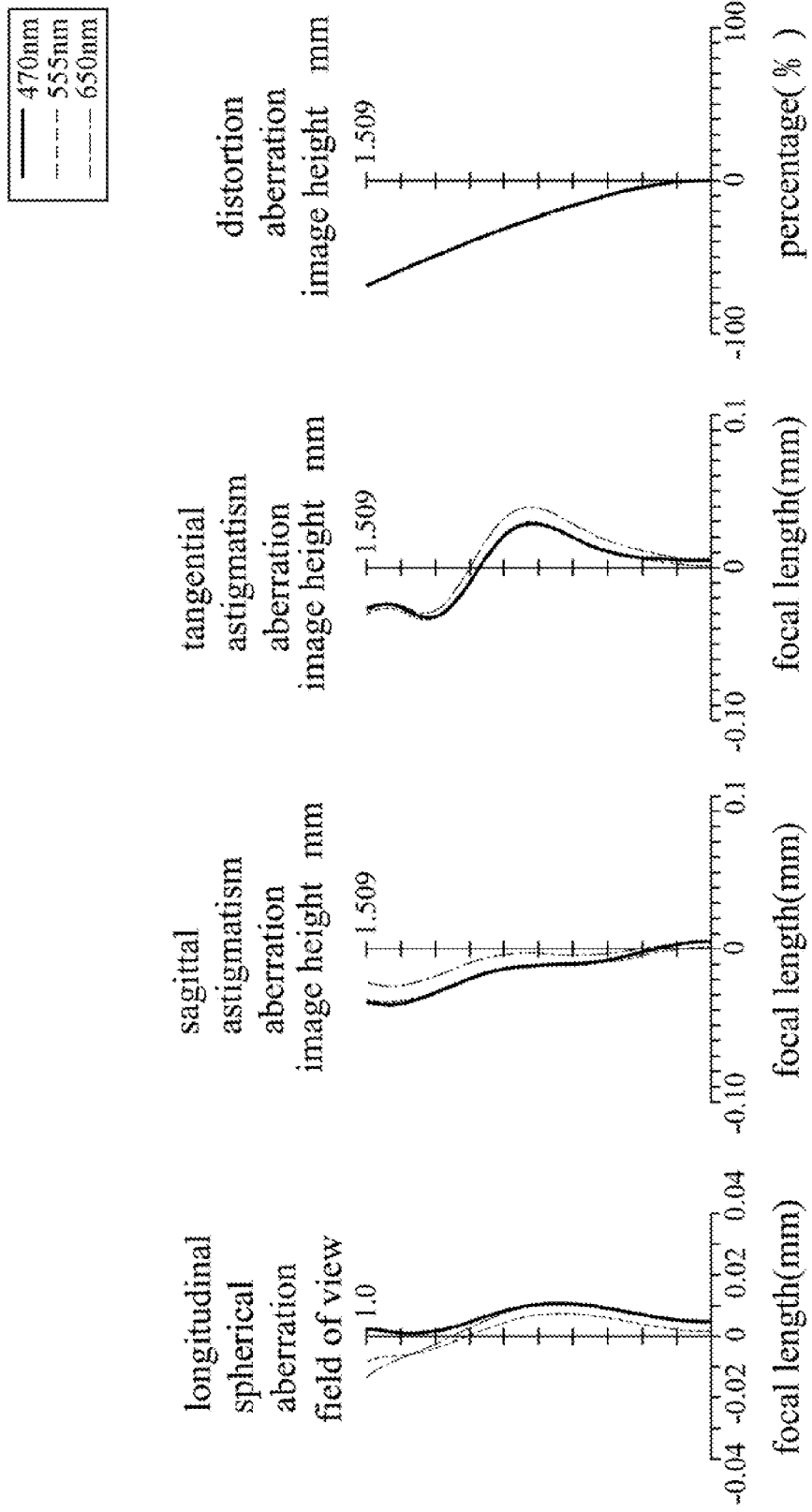
FIGS. 9(a) to 9(d) show different optical characteristics of the imaging lens of the second embodiment.

FIGS. 9(*a*) to 9(*d*) respectively show simulation results corresponding to longitudinal spherical aberration, sagittal astigmatism aberration, tangential astigmatism aberration, and distortion aberration of the second embodiment. It can be understood from FIGS. 9(*a*) to 9(*d*) that the second embodiment is able to achieve a relatively good optical performance.

Via the aforementioned description, the advantages of the second embodiment in contrast to the first embodiment are as follows. The imaging lens 10 of this embodiment has a shorter system length and better imaging quality, and is easier to manufacture, providing higher yield.

Figure 10:
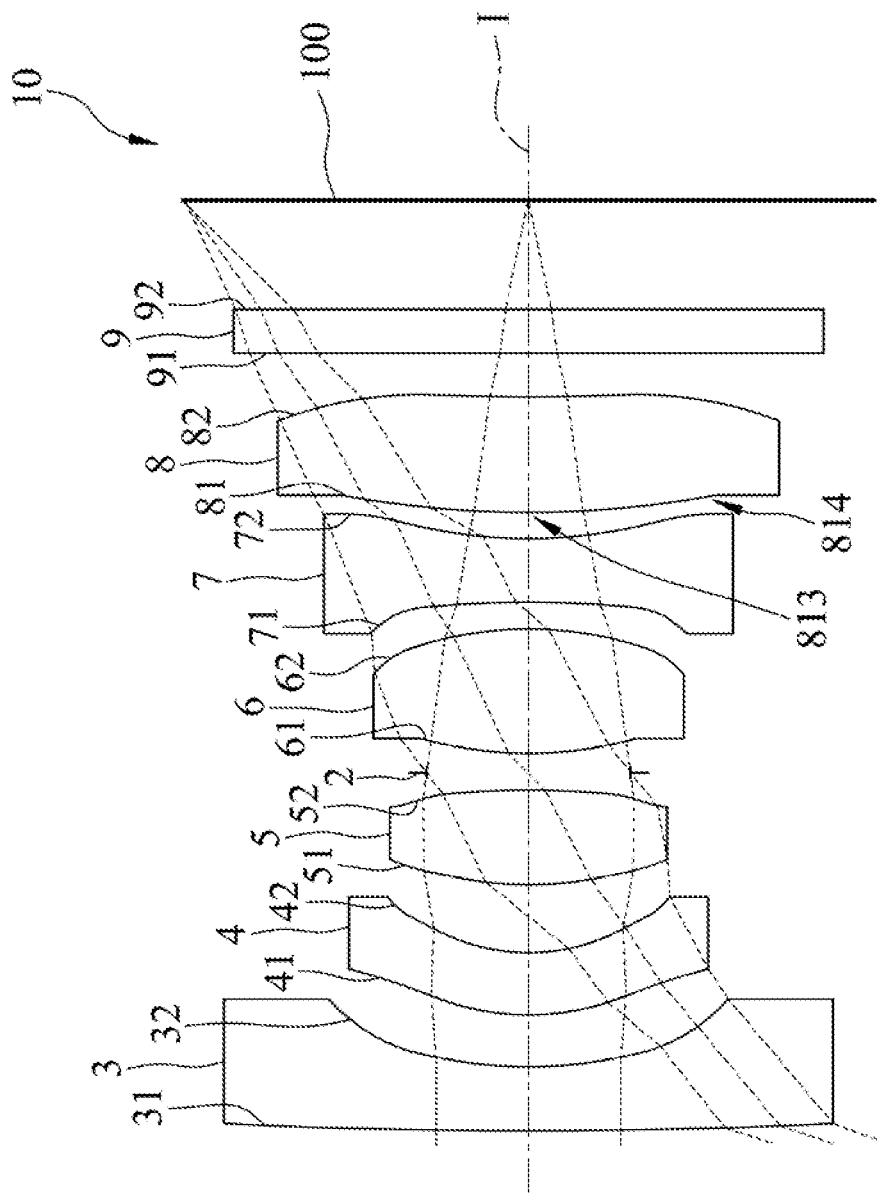
FIG. 10 is a schematic diagram that illustrates the third embodiment of an imaging lens according to the present invention.

FIG. 10 illustrates a third embodiment of an imaging lens 10 according to the present invention, which has a configuration similar to that of the first embodiment and differs in optical data, aspherical coefficients, and lens parameters of the first, second, third, fourth, fifth and sixth lens elements 3-8. Moreover, the object-side surface 81 of the sixth lens element 8 has a convex portion 813 in a vicinity of the optical axis (I), and a concave portion 814 in a vicinity of the periphery of the sixth lens element 8. It should be noted herein that, in order to clearly illustrate the third embodiment, reference numerals of the convex and concave portions that are the same as those of the first embodiment have been omitted in FIG. 10.

Shown in FIG. 11 is a table that lists values of some optical data corresponding to the surfaces 31-91, 32-92 of the third embodiment. The imaging lens 10 has an overall system focal length of 2.090 mm, an HFOV of 70.000°, an F-number of 2.400, and a system length of 4.350 mm.

Shown in FIG. 12 is a table that lists values of some aspherical coefficients of the aforementioned relationship (1) corresponding to the third embodiment.

Relationships among some of the aforementioned lens parameters corresponding to the third embodiment are shown in FIG. 26.

Figure 13:
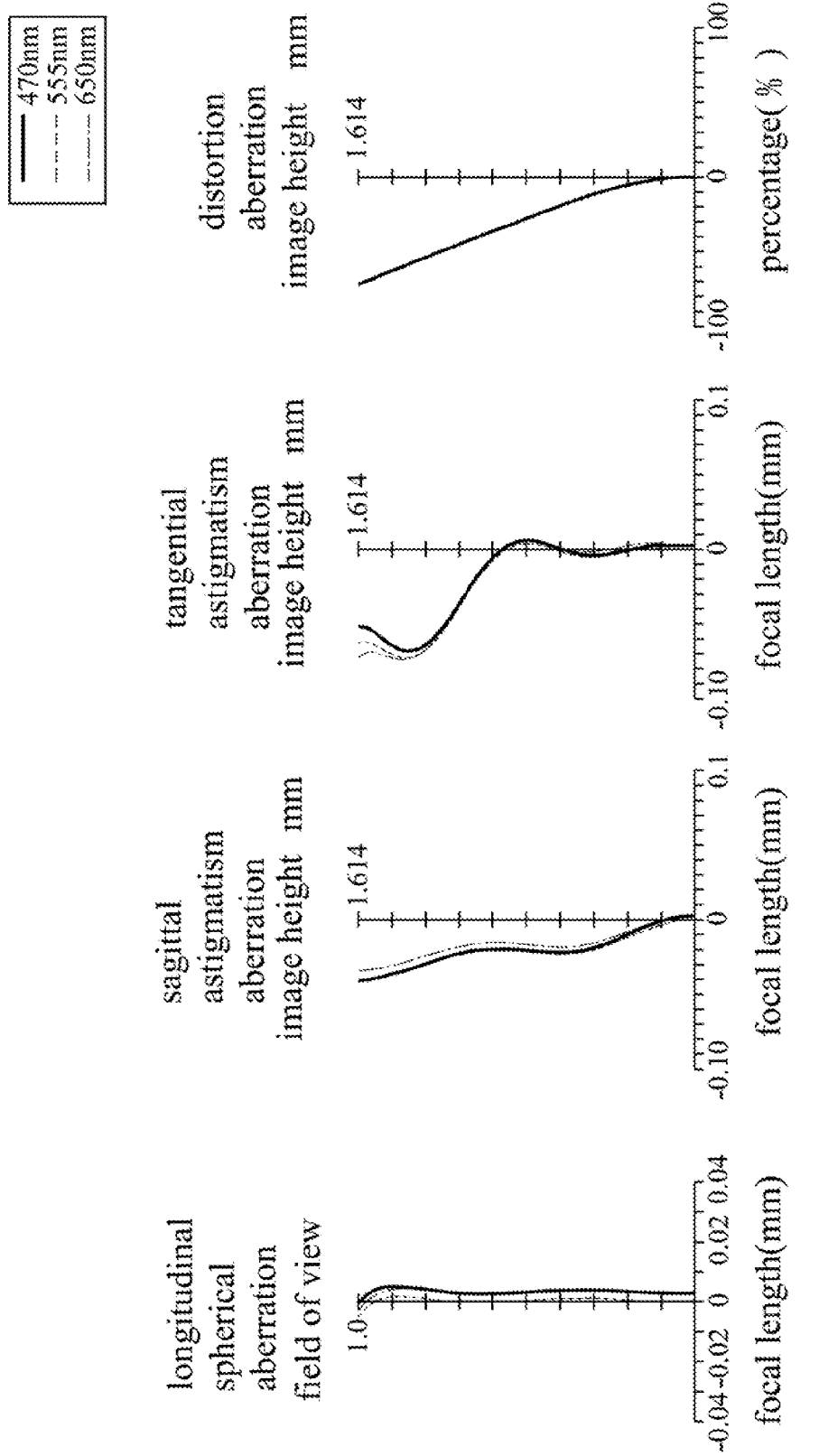
FIGS. 13(a) to 13(d) show different optical characteristics of the imaging lens of the third embodiment.

FIGS. 13(*a*) to 13(*d*) respectively show simulation results corresponding to longitudinal spherical aberration, sagittal astigmatism aberration, tangential astigmatism aberration, and distortion aberration of the third embodiment. It can be understood from FIGS. 13(*a*) to 13(*d*) that the third embodiment is able to achieve a relatively good optical performance.

Via the aforementioned description, the advantage of the third embodiment in contrast to the first embodiment is that the imaging lens 10 of the third embodiment has better imaging quality and is easier to manufacture, providing higher yield.

Figure 14:
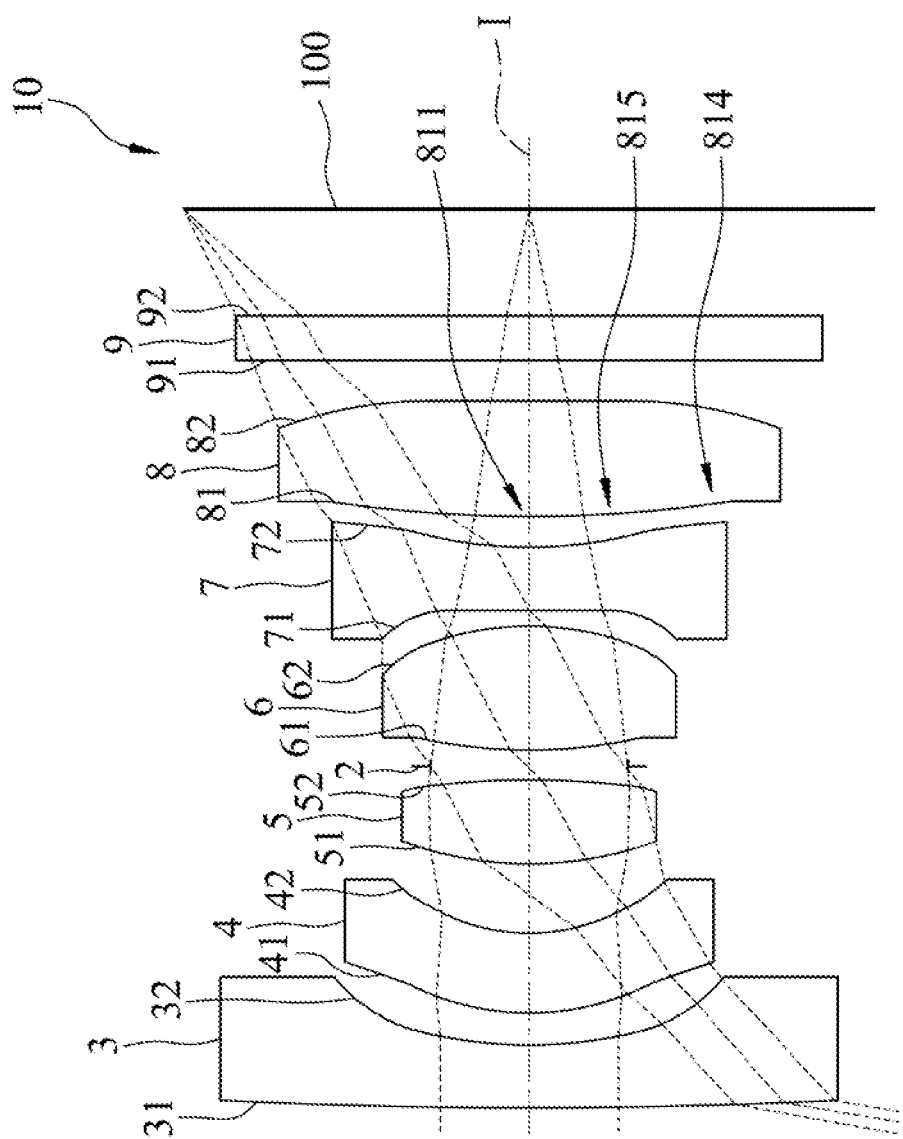
FIG. 14 is a schematic diagram that illustrates the fourth embodiment of an imaging lens according to the present invention.

FIG. 14 illustrates a fourth embodiment of an imaging lens 10 according to the present invention, which has a configuration similar to that of the first embodiment and differs in optical data, aspherical coefficients, and lens parameters of the first, second, third, fourth, fifth and sixth lens elements 3-8. Moreover, the object-side surface 81 of the sixth lens element 8 has a concave portion 811 in a vicinity of the optical axis (I), a concave portion 814 in a vicinity of the periphery of the sixth lens element 8, and a convex portion 815 between the concave portions 811, 814. It should be noted herein that, in order to clearly illustrate the fourth embodiment, reference numerals of the convex and concave portions that are the same as those of the first embodiment have been omitted in FIG. 14.

Shown in FIG. 15 is a table that lists values of some optical data corresponding to the surfaces 31-91, 32-92 of the fourth embodiment. The imaging lens 10 has an overall system focal length of 2.014 mm, an HFOV of 80.000°, an F-number of 2.4, and a system length of 4.300 mm.

Shown in FIG. 16 is a table that lists values of some aspherical coefficients of the aforementioned relationship (1) corresponding to the fourth embodiment.

Relationships among some of the aforementioned lens parameters corresponding to the fourth embodiment are shown in FIG. 26.

Figure 17:
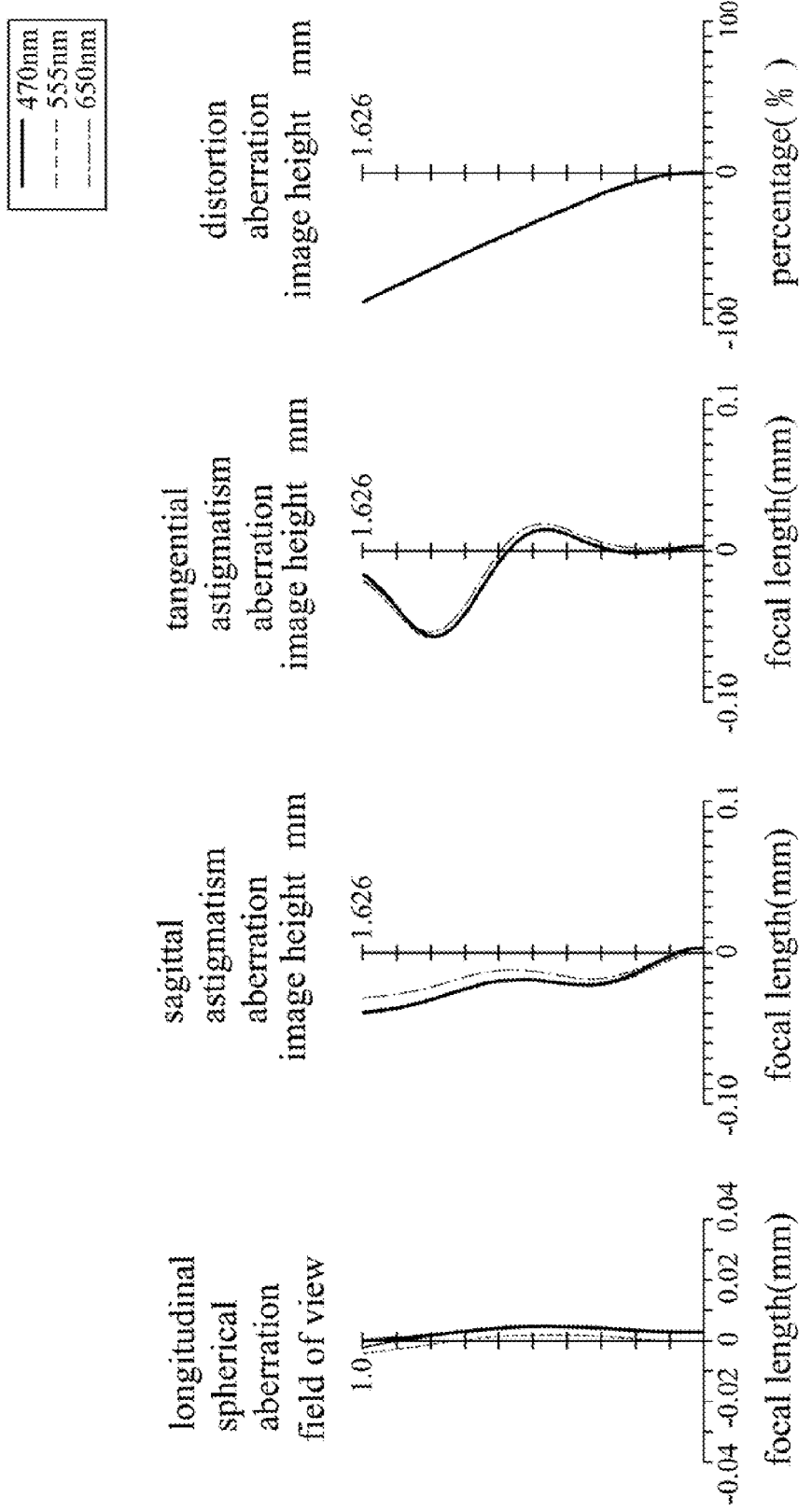
FIGS. 17(a) to 17(d) show different optical characteristics of the imaging lens of the fourth embodiment.

FIGS. 17(*a*) to 17(*d*) respectively show simulation results corresponding to longitudinal spherical aberration, sagittal astigmatism aberration, tangential astigmatism aberration, and distortion aberration of the fourth embodiment. It can be understood from FIGS. 17(*a*) to 17(*d*) that the fourth embodiment is able to achieve a relatively good optical performance.

Via the aforementioned description, the advantage of the fourth embodiment in contrast to the first embodiment is that the imaging lens 10 of the fourth embodiment has a wider HFOV and better imaging quality, and is easier to manufacture, providing higher yield.

Figure 18:
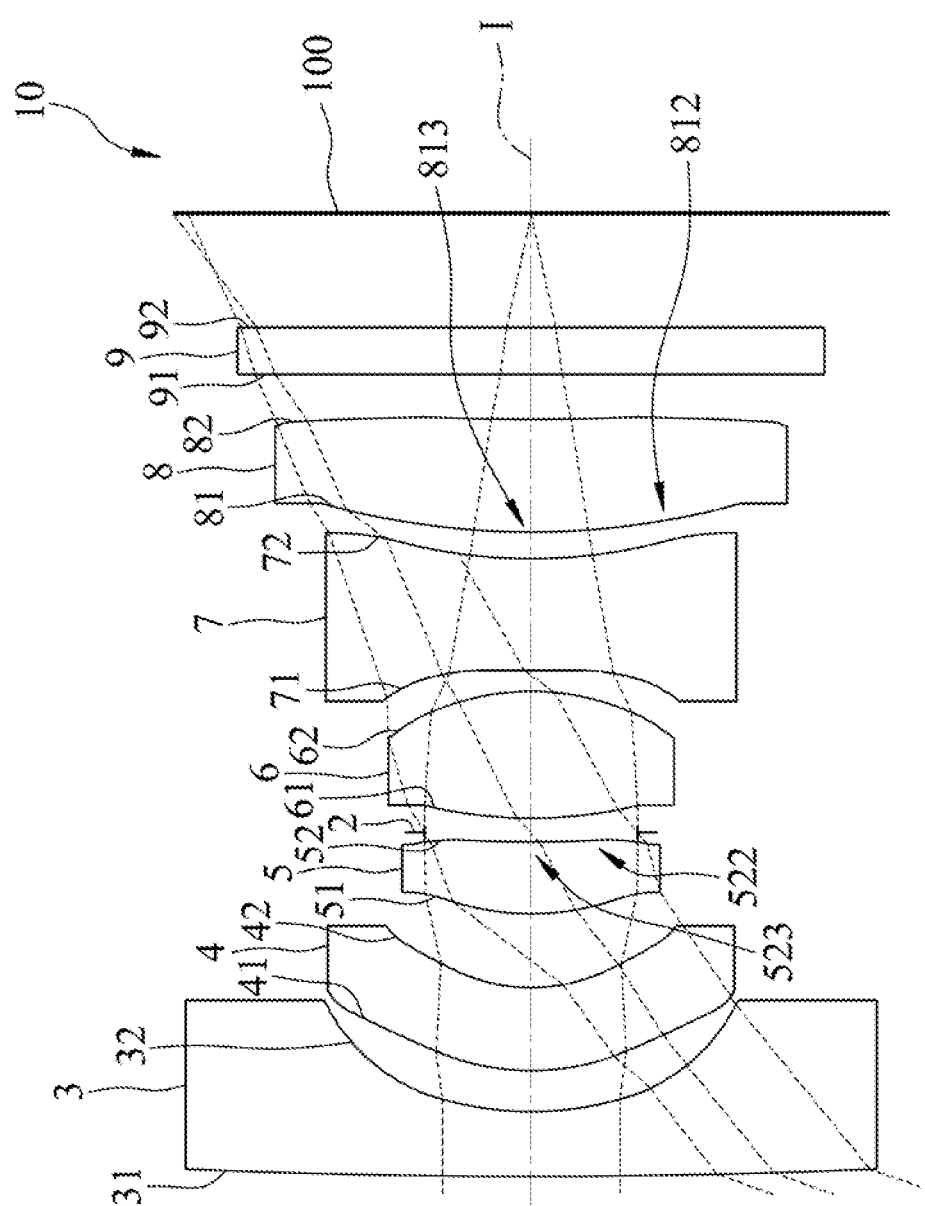
FIG. 18 is a schematic diagram that illustrates the fifth embodiment of an imaging lens according to the present invention.
Figure 21:
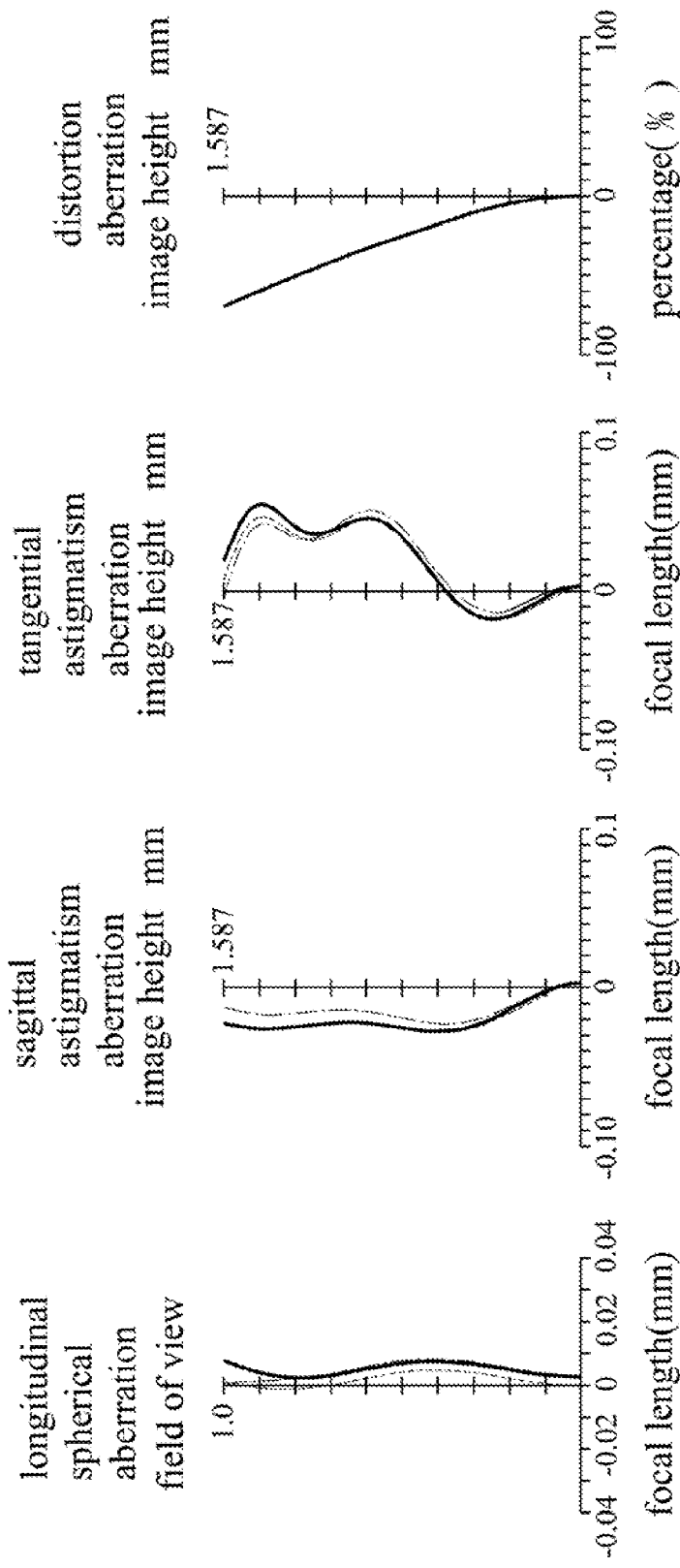
FIGS. 21(a) to 21(d) show different optical characteristics of the imaging lens of the fifth embodiment.

FIG. 18 illustrates a fifth embodiment of an imaging lens 10 according to the present invention, which has a configuration similar to that of the first embodiment and differs in optical data, aspherical coefficients, and lens parameters of the first, second, third, fourth, fifth and sixth lens elements 3-8. Moreover, the image-side surface 52 of the third lens element 5 has a concave portion 523 in a vicinity of the optical axis (I), and a convex portion 522 in a vicinity of the periphery of the third lens element 5. The sixth lens element 8 has a positive refractive power. The object-side surface 81 of the sixth lens element 8 is a convex surface that has a convex portion 813 in a vicinity of the optical axis (I), and a convex portion 812 in a vicinity of the periphery of the sixth lens element 8. It should be noted herein that, in order to clearly illustrate the fifth embodiment, reference numerals of the convex and concave portions that are the same as those of the first embodiment have been omitted in FIG. 18.

Shown in FIG. 19 is a table that lists values of some optical data corresponding to the surfaces 31-91, 32-92 of the fifth embodiment. The imaging lens 10 has an overall system focal length of 1.895 mm, an HFOV of 70.00°, an F-number of 2.4, and a system length of 4.300 mm.

Shown in FIG. 20 is a table that lists values of some aspherical coefficients of the aforementioned relationship (1) corresponding to the fifth embodiment.

Relationships among some of the aforementioned lens parameters corresponding to the fifth embodiment are shown in FIG. 26.

FIGS. 21(a) to 21(d) respectively show simulation results corresponding to longitudinal spherical aberration, sagittal astigmatism aberration, tangential astigmatism aberration, and distortion aberration of the fifth embodiment. It can be understood from FIGS. 21(a) to 21(d) that the fifth embodiment is able to achieve a relatively good optical performance.

Via the aforementioned description, the advantage of the fifth embodiment in contrast to the first embodiment is that the imaging lens 10 of the fifth embodiment has better imaging quality and is easier to manufacture, providing higher yield.

Figure 22:
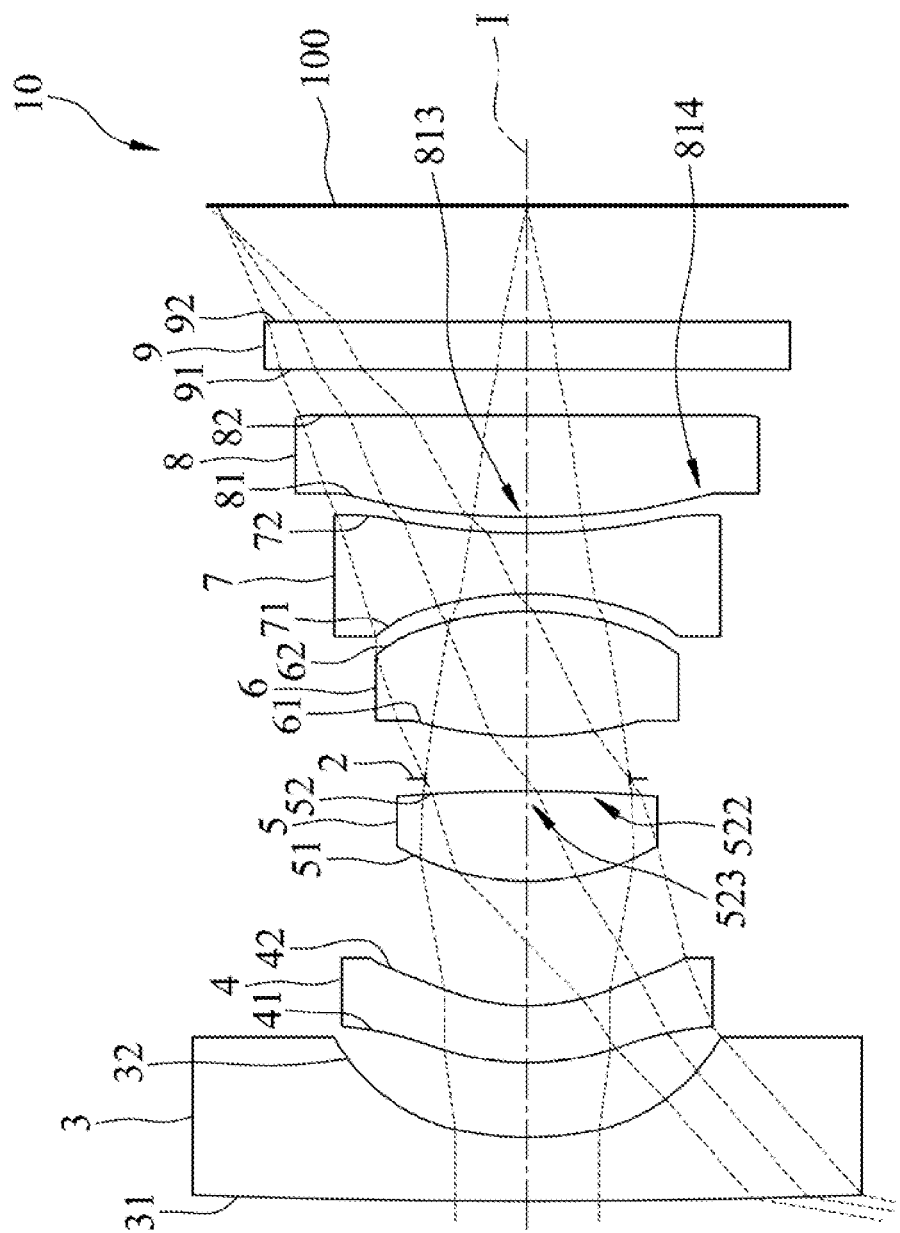
FIG. 22 is a schematic diagram that illustrates the sixth embodiment of an imaging lens according to the present invention.
Figures 25A, 25B, 25C, 25D:
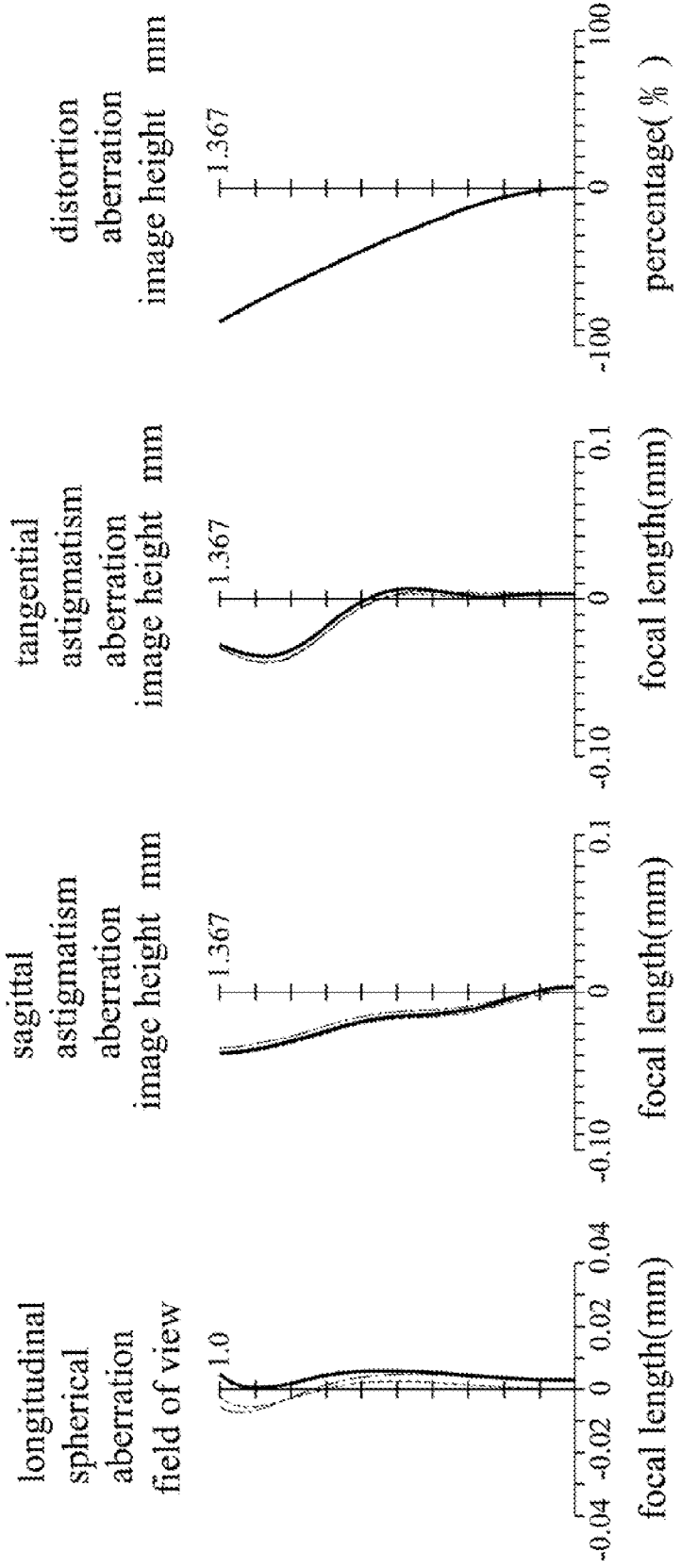
FIGS. 25(a) to 25(d) show different optical characteristics of the imaging lens of the sixth embodiment.

FIG. 22 illustrates a sixth embodiment of an imaging lens 10 according to the present invention, which has a configuration similar to that of the first embodiment and differs in optical data, aspherical coefficients, and lens parameters of the first, second, third, fourth, fifth and sixth lens elements 3-8. Moreover, the image-side surface 52 of the third lens element 5 has a concave portion 523 in a vicinity of the optical axis (I), and a convex portion 522 in a vicinity of the periphery of the third lens element 5. The sixth lens element 8 has a positive refractive power. The object-side surface 81 of the sixth lens element 8 has a convex portion 813 in a vicinity of the optical axis (I), and a concave portion 814 in a vicinity of the periphery of the sixth lens element 8. It should be noted herein that, in order to clearly illustrate the sixth embodiment, reference numerals of the convex and concave portions that are the same as those of the first embodiment have been omitted in FIG. 22.

Shown in FIG. 23 is a table that lists values of some optical data corresponding to the surfaces 31-91, 32-92 of the sixth embodiment. The imaging lens 10 has an overall system focal length of 1.542 mm, an HFOV of 80.00°, an F-number of 2.4, and a system length of 4.350 mm.

Shown in FIG. 24 is a table that lists values of some aspherical coefficients of the aforementioned relationship (1) corresponding to the sixth embodiment.

Relationships among some of the aforementioned lens parameters corresponding to the sixth embodiment are shown in FIG. 26.

FIGS. 25(a) to 25(d) respectively show simulation results corresponding to longitudinal spherical aberration, sagittal astigmatism aberration, tangential astigmatism aberration, and distortion aberration of the sixth embodiment. It can be understood from FIGS. 25(a) to 25(d) that the sixth embodiment is able to achieve a relatively good optical performance.

Via the aforementioned description, the advantage of the sixth embodiment in contrast to the first embodiment is that the imaging lens 10 of the sixth embodiment has a wider HFOV and better imaging quality, and is easier to manufacture, providing higher yield.

Shown in FIG. 26 is a table that lists the aforesaid relationships among some of the aforementioned lens parameters corresponding to the six embodiments. When the lens parameters of the imaging lens 10 according to this invention satisfy the following relationships, the optical performance is still relatively good even with the reduced system length:

(1) Gaa/T5≤5.5: Reduction of Gaa and T5 allow reduction of the overall length of the imaging lens 10. However, reduction of T5 is limited due to industrial manufacturing technology, whereas reduction of Gaa is less restricted. Thus, Gaa/T5 will tend to be small, preferably 1.0≤Gaa/T5≤5.5.

(2) T2/G12≥1.0, ALT/G12≥10.0, T2/G23≥0.8, T1/G34≥1.0, T3/G34≥2.6, T4/G34≥3.0, ALT/G34≥14.0 and Gaa/T4≤2.5: According to the previous paragraph, reduction of the thickness of each of the lens elements such as T1, T2, T3 and T4 is limited due to industrial manufacturing technology. On the other hand, the air gap lengths among the lens elements such as G12, G23, G34 and Gaa should be reduced for achieving the purpose of thickness reduction. Thus, T2/G12, ALT/G12, T2/G23, T1/G34, T3/G34, T4/G34 and ALT/G34 should be designed to be large whereas Gaa/T4 should be designed to be small. Preferably, 1.0≤T2/G12≤3.0, 10.0≤ALT/G12≤20.0, 0.8≤T2/G23≤1.5, 1.0≤T1/G34≤4.0, 2.6≤T3/G34≤4.0, 3.0≤T4/G34≤6.0, 14.0≤ALT/G34≤30.0 and 1.0≤Gaa/T4≤2.5.

(3) T2/T1≥0.7, T2/T5≥0.7 and T4/T3≥1.1: Proper ratios among T1 to T5 should be maintained to prevent any of the lens elements from being thicker than necessary which will lengthen the imaging lens 10, or thinner than necessary which will complicate the manufacturing process. Preferably, 0.7≤T2/T1≤1.5, 0.7≤T2/T5≤2.0 and 1.1≤T4/T3≤2.0.

(4) G12/G45≤2.2, G12/G56≤2.0, G56/G45≥0.8 and G56/G34≥1.0: Proper ratios among G12, G34, G45 and G56 should also be maintained to prevent any of the air gap lengths from being too long which will lengthen the imaging lens 10, or too short which will complicate the manufacturing process. Preferably, 1.0≤G12/G45≤2.2, 0.5≤G12/G56≤2.0, 0.8≤G56/G45≤3.5 and 1.0≤G56/G34≤3.5.

(5) T4/G56≤10.0: Satisfaction of this relationship may prevent the thickness of the fourth lens element 6 from being too thick. Preferably, 1.0≤T4/G56≤10.0.

However, in view of the unpredictability of the optical system design, under the framework of the present invention, conforming with the aforementioned conditions, the imaging lens 10 may have a shorter system length, a smaller F-number, a wider field-of-view, better imaging quality or enhanced assembly yield compared to the prior art.

To sum up, effects and advantages of the imaging lens 10 according to the present invention are described hereinafter.

1) The convex portion 311 of the object-side surface 31 of the first lens element 3 can assist in the collection of rays/beams of light. The concave portion 322 of the image-side surface 32 of the first lens element 3, the convex portion 412 of the object-side surface 41 of the second lens element 4, the convex portion 512 of the object-side surface 51 of the third lens element 5, the convex portion 522 of the image-side surface 52 of the third lens element 5, the convex portion 611 of the object-side surface 61 of the fourth lens element 6, the concave portion 712 of the object-side surface 71 of the fifth lens element 7 and the convex portion 822 of the image-side surface 82 of the sixth lens element 8 can be configured to cooperatively improve aberration and broaden/expand the viewing angle.

2) Through design of the relevant optical parameters, optical aberrations, such as spherical aberration, may be reduced or even eliminated. Further, through surface design and arrangement of the lens elements 3-8, even with the system length reduced, optical aberrations may still be reduced or even eliminated, resulting in relatively good optical performance.

3) Through the aforesaid six embodiments, it is known that the length of the imaging lens 10 of this invention may be reduced down to below 4.400 mm while maintaining good optical performance.

Figure 27:
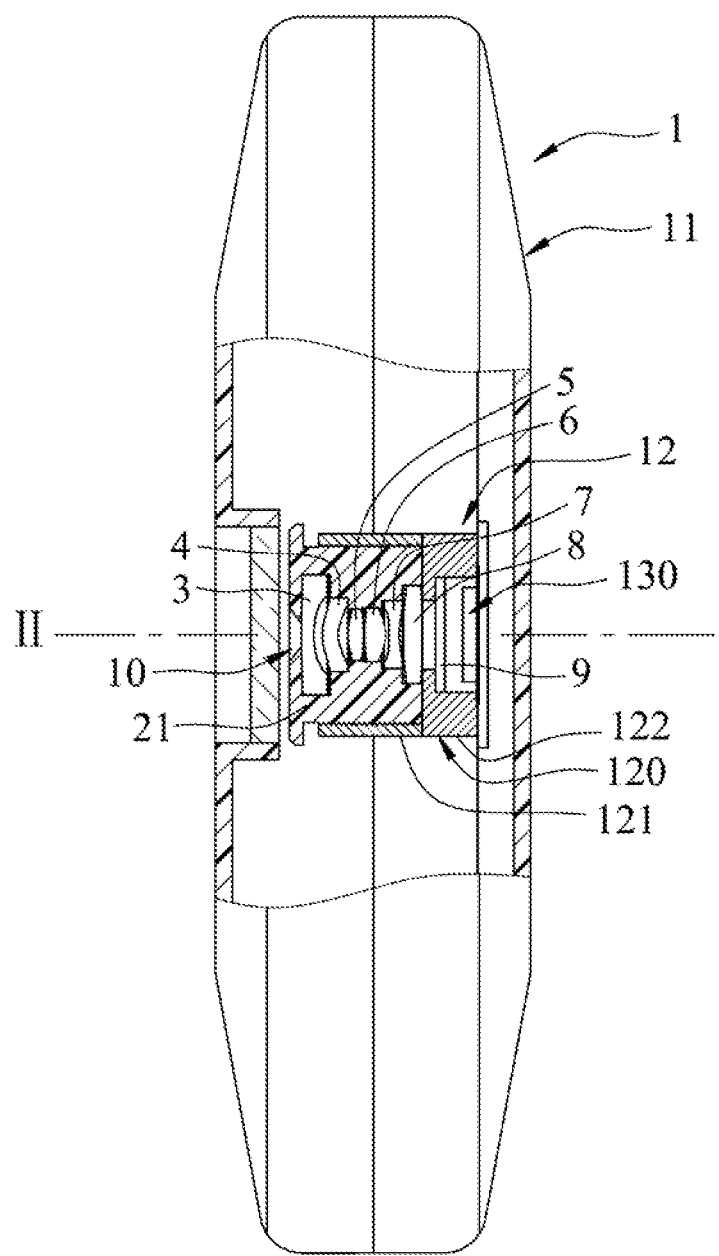
FIG. 27 is a schematic partly sectional view to illustrate a first exemplary application of the imaging lens of the present invention.

Shown in FIG. 27 is a first exemplary application of the imaging lens 10, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 28:
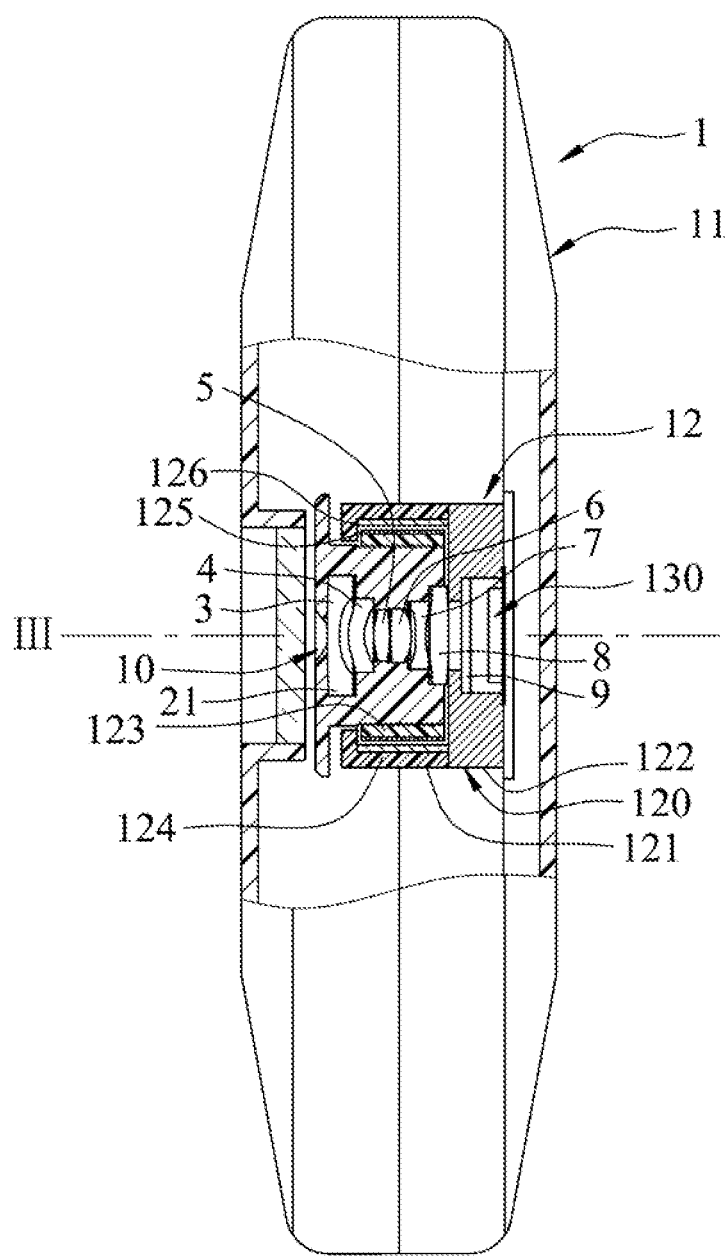
FIG. 28 is a schematic partly sectional view to illustrate a second exemplary application of the imaging lens of the present invention.

Shown in FIG. 28 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, a fourth lens element, a fifth lens element and a sixth lens element arranged in order from an object side to an image side along an optical axis of said imaging lens, each of said first lens element, said second lens element, said third lens element, said fourth lens element, said fifth lens element and said sixth lens element having a refractive power, an object-side surface facing toward the object side, and an image-side surface facing toward the image side, wherein:

said object-side surface of said first lens element has a convex portion in a vicinity of a periphery of said first lens element, and said image-side surface of said first lens element has a concave portion in a vicinity of the periphery of said first lens element;

said object-side surface of said second lens element has a convex portion in a vicinity of a periphery of said second lens element;

said object-side surface of said third lens element has a convex portion in a vicinity of a periphery of said third lens element, and said image-side surface of said third lens element has a convex portion in a vicinity of the periphery of the third lens element;

said object-side surface of said fourth lens element has a convex portion in a vicinity of the optical axis;

said object-side surface of said fifth lens element has a concave portion in a vicinity of a periphery of said fifth lens element;

said image-side surface of said sixth lens element has a convex portion in a vicinity of a periphery of said sixth lens element; and said imaging lens does not include any lens element with refractive power other than said first lens element, said second lens element, said third lens element, said fourth lens element, said fifth lens element and said sixth lens element, and satisfies Gaa/T5≤5.5, where Gaa represents a sum of five air gap lengths among said first lens element, said second lens element, said third lens element, said fourth lens element, said fifth lens element and said sixth lens element at the optical axis, and T5 represents a thickness of said fifth lens element at the optical axis.

2. The imaging lens as claimed in claim 1, further satisfying T2/T1≥0.7, where T1 represents a thickness of said first lens element at the optical axis, and T2 represents a thickness of said second lens element at the optical axis.

3. The imaging lens as claimed in claim 2, further satisfying T4/G56≤10, where T4 represents a thickness of said fourth lens element at the optical axis, and G56 represents the air gap length between said fifth lens element and said sixth lens element at the optical axis.

4. The imaging lens as claimed in claim 2, further satisfying T1/G34≥1, where G34 represents the air gap length between said third lens element and said fourth lens element at the optical axis.

5. The imaging lens as claimed in claim 2, further satisfying G12/G56≤2.0, where G12 represents the air gap length between said first lens element and said second lens element, at the optical axis, and G56 represents the air gap length between said fifth lens element and said sixth lens element at the optical axis.

6. The imaging lens as claimed in claim 1, further satisfying T2/G12≥1, where T2 represents a thickness of said second lens element at the optical axis, and G12 represents the air gap length between said first lens element and said second lens element at the optical axis.

7. The imaging lens as claimed in claim 6, further satisfying T2/T5≥0.7.

8. The imaging lens as claimed in claim 1, further satisfying ALT/G12≥10, where G12 represents the air gap length between said first lens element and said second lens element at the optical axis, and ALT represents a sum of thicknesses of said first, second, third, fourth, fifth and sixth lens elements at the optical axis.

9. The imaging lens as claimed in claim 8, further satisfying T3/G34≥2.6, where T3 represents the thickness of said third lens element at the optical axis, and G34 represents the air gap length between said third lens element and said fourth lens element at the optical axis.

10. The imaging lens as claimed in claim 8, further satisfying $T4/G34 \geq 3.0$, where T4 represents the thickness of said fourth lens element at the optical axis, and G34 represents the air gap length between said third lens element and said fourth lens element at the optical axis.

11. The imaging lens as claimed in claim 8, further satisfying $T4/T3 \geq 1.1$, where T3 represents the thickness of said third lens element at the optical axis, and T4 represents the thickness of said fourth lens element at the optical axis.

12. The imaging lens as claimed in claim 1, further satisfying $G12/G45 \leq 2.2$, where G12 represents the air gap length between said first lens element and said second lens element at the optical axis, and G45 represents the air gap length between said fourth lens element and said fifth lens element at the optical axis.

13. The imaging lens as claimed in claim 12, further satisfying $ALT/G34 \geq 14.0$, where G34 represents the air gap length between said third lens element and said fourth lens element at the optical axis, and ALT represents a sum of thicknesses of said first, second, third, fourth, fifth and sixth lens elements at the optical axis.

14. The imaging lens as claimed in claim 12, further satisfying $Gaa/T4 \leq 2.5$, where T4 represents a thickness of said fourth lens element at the optical axis.

15. The imaging lens as claimed in claim 1, further satisfying $T2/G23 \geq 0.8$, where T2 represents a thickness of said second lens element at the optical axis, and G23 represents the air gap length between said second lens element and said third lens element at the optical axis.

16. The imaging lens as claimed in claim 15, further satisfying $G56/G45 \geq 0.8$, where G45 represents the air gap length between said fourth lens element and said fifth lens element at the optical axis, and G56 represents the air gap length between said fifth lens element and said sixth lens element at the optical axis.

17. The imaging lens as claimed in claim 15, further satisfying $G56/G34 \geq 1.0$, where G34 represents the air gap length between said third lens element and said fourth lens element at the optical axis, and G56 represents the air gap length between said fifth lens element and said sixth lens element at the optical axis.

18. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *